(12) United States Patent
Sun et al.

(10) Patent No.: US 10,620,331 B2
(45) Date of Patent: Apr. 14, 2020

(54) REVERSE TIME MIGRATION IN ANISOTROPIC MEDIA WITH STABLE ATTENUATION COMPENSATION

(71) Applicants: Junzhe Sun, Houston, TX (US); Jia Yan, Houston, TX (US)

(72) Inventors: Junzhe Sun, Houston, TX (US); Jia Yan, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 79 days.

(21) Appl. No.: 15/491,111

(22) Filed: Apr. 19, 2017

(65) Prior Publication Data

US 2017/0371050 A1 Dec. 28, 2017

Related U.S. Application Data

(60) Provisional application No. 62/355,545, filed on Jun. 28, 2016.

(51) Int. Cl.
| | | |
|---|---|---|
| *G01V 1/28* | (2006.01) | |
| *G01V 1/36* | (2006.01) | |
| *G01V 1/00* | (2006.01) | |
| *G01V 1/30* | (2006.01) | |
| *G01V 1/40* | (2006.01) | |

(52) U.S. Cl.
CPC .............. *G01V 1/282* (2013.01); *G01V 1/003* (2013.01); *G01V 1/30* (2013.01); *G01V 1/368* (2013.01); *G01V 1/40* (2013.01); *G01V 2210/626* (2013.01); *G01V 2210/679* (2013.01)

(58) Field of Classification Search
CPC .......... G01V 1/003; G01V 1/282; G01V 1/30; G01V 1/40
See application file for complete search history.

(56) References Cited

U.S. PATENT DOCUMENTS

| | | | |
|---|---|---|---|
| 8,296,069 B2 | 10/2012 | Etgen et al. | |
| 8,553,498 B2 * | 10/2013 | Hu | .......................... G01V 1/306 367/38 |
| 8,560,242 B2 | 10/2013 | Etgen et al. | |

(Continued)

OTHER PUBLICATIONS

Zhu, T., et al. (2014) "Q-compensated reverse-time migration" Geophysics, vol. 79, No. 3, pp. S77-S87. (Year: 2014).*

(Continued)

*Primary Examiner* — Manuel A Rivera Vargas
*Assistant Examiner* — Yaritza H Perez Bermudez
(74) *Attorney, Agent, or Firm* — ExxonMobil Upstream Research Company—Law Department (57) ABSTRACT

A method, including: obtaining Earth models including velocity, anisotropy, and attenuation reconstructing a source wavefield using the Earth models; reconstructing a receiver wavefield using the Earth models, wherein the reconstructing the source wavefield and the receiver wavefield each include applying an attenuation operator that increases an amplitude of down-going wavefields within an attenuation body and that decreases an amplitude of up-going wavefields within the attenuation body; applying an imaging condition to the source wavefield and receiver wavefield for a plurality of shots; and generating a subsurface image by stacking images for the plurality of shots.

9 Claims, 9 Drawing Sheets

(56) References Cited

U.S. PATENT DOCUMENTS

| | | | |
|---|---|---|---|
| 2011/0090760 A1* | 4/2011 | Rickett et al. | G01V 1/282 367/73 |
| 2011/0317519 A1* | 12/2011 | Liu | G01V 1/28 367/50 |
| 2013/0265851 A1* | 10/2013 | Faber | G01V 1/42 367/25 |
| 2014/0336940 A1* | 11/2014 | Bettinelli | G01V 1/282 702/14 |
| 2015/0253444 A1* | 9/2015 | Hu | G01V 1/282 702/14 |
| 2015/0378039 A1* | 12/2015 | Sun | G01V 1/303 702/14 |
| 2016/0170059 A1 | 6/2016 | Ramos-Martinez et al. | |
| 2016/0291177 A1* | 10/2016 | Albertin | G01V 1/282 |
| 2016/0291178 A1* | 10/2016 | Xie | G01V 1/282 |
| 2016/0291184 A1* | 10/2016 | Coates | G01V 1/282 |
| 2016/0341835 A1* | 11/2016 | Guillaume | G01V 1/303 |
| 2017/0168177 A1* | 6/2017 | Wang | G01V 1/36 |
| 2017/0205520 A1* | 7/2017 | Moldoveanu | G01V 1/3808 |
| 2017/0254914 A1* | 9/2017 | Siliqi | G01V 1/3817 |

OTHER PUBLICATIONS

Alkhalifah, T., et al. (1995) "Velocity analysis for transversely isotropic media", *Geophysics*, vol. 60, No. 5; pp. 1550-1566.

Alkhalifah, T., (1998) "Acoustic approximations for processing in transversely isotropic media", *Geophysics*, vol. 63, No. 2, pp. 623-631.

Bickel, S. H., et al. (1985) "Plane-wave Q deconvolution" *Geophysics*, vol. 50, No. 9, pp. 1426-1439.

Cavalca, M., R., et al. (2013) "Q-compensation in complex media—Ray-based and wavefield extrapolation approaches" *83rd Annual International Meeting, SEG*, Expanded Abstracts, pp. 3831-3835.

Chen, Y, et al. (2010) "Use Q-RTM to Image Beneath Gas Hydrates in Alaminos Canyon, Gulf of Mexico" SEG, 2010 SEG Annual Meeting, Oct. 17-22, Denver, Colorado. pp. 3165-3170.

Deng, F., et al. , (2008) "Viscoelastic true-amplitude prestack reverse-time depth migration", *Geophysics*, vol. 73, No. 4, pp. S143-S155.

Ester, M; et al. (1996), "A Density-Based Algorithm for Discovering Clusters in Large Spatial Databases with Noise", Proc. of 2nd Intl. Conf. on Knowledge Discovery and Data Mining; 6 pages.

Fomel S., (2004) "On anelliptic approximations for qP velocities in VTI media" *Geophysical Prospecting*, No. 52, pp. 247-259.

Fomel, S., et al. (2013) "Seismic wave extrapolation using lowrank symbol approximation" *Geophysical Prospecting*, 61, 526-536.

Hargreaves, N. D. et al. (1991), Inverse Q filtering by Fourier transform: *Geophysics*, vol. 56, No. 4, pp. 519-527.

Kjartansson, E., (1979) Constant-Q wave propagation and attenuation: Journal of Geophysical Research, 84, 4737-4748.

Meagher, Donald (Oct. 1980). "Octree Encoding: A New Technique for the Representation, Manipulation and Display of Arbitrary 3-D Objects by Computer", Rensselaer Polytechnic Institute (Technical Report IPL-TR-80-111). 121 pages.

Mittet, R., et al. (1995) "Prestack depth migration with compensation for absorption and dispersion" *Geophysics*, 60, No. 5, pp. 1485-1494.

Steinhause, H. (1956) "Sur la division des corps materiels en parties" Bulletin De L'Academie Polonaise Des Sciences, CL.III—vol. IV, No. 12, 1956. Presente le Oct. 19, 1956 pp. 801-804 A. Original French version B. Machine Translation into English (Jul. 2017).

Suh, S., K., et al. (2012) "Compensating visco-acoustic effects in anisotropic reverse-time migration:" *82nd Annual International Meeting*, SEG, Expanded Abstracts, pp. 1-5.

Sun, J., et al. (2013) "Low-rank one-step wave extrapolation" *SEG 83rd Annual International Meeting*, Expanded Abstracts, pp. 3905-3910.

Sun, J., T., et al. (2015) "Viscoacoustic modeling and imaging using low-rank approximation" *Geophysics*, vol. 80, No. 5, pp. A103-A108.

Sun, J., T., et al. (2015) "Preconditioning Least-Squares RTM in Viscoacoustic Media by Q-compensated RTM" SEG Technical Program Expanded Abstracts; pp. 3959-3965.

Traynin, P., et al., (2008) "Amplitude and bandwidth recovery beneath gas zones using Kirchhoff prestack depth Q-migration" *78th Annual International Meeting*, SEG, Expanded Abstracts, pp. 2412-2416.

Valenciano, A. A., et al. (2011) "Wave equation migration with attenuation and anisotropy compensation" *81st Annual International Meeting*, SEG, Expanded Abstracts, pp. 232-236.

Wang, Y., (2002) "A stable and efficient approach of inverse Q filtering" Geophysics, 67, No. 2, 657-663.

Xie, Y., et al., (2015) "Compensating for visco-acoustic effects in TTI reverse time migration" *85th Annual International Meeting*, SEG, Expanded Abstrcts, pp. 3996-4001.

Zhang, Y., P. (2010) "Compensating for viscoacoustic effects in reverse-time migration" *80th Annual International Meeting*, SEG, Expanded Abstracts, pp. 3160-3164.

Zhu, T., et al. (2014) "Q-compensated reverse-time migration" *Geophysics*, vol. 79, No. 3, S77-S87.

Zhu, T., et al. (2014) "Modeling acoustic wave propagation in heterogeneous attenuating media using decoupled fractional Laplacians" *Geophysics*, vol. 79, No. 3, T105-T116.

Zhu, T., et al. (2015) "Improved Seismic Image by Q-compensated Reverse Time Migration: Application to Crosswell Field Data, West Texas" *Geophysics*, vol. 80, No. 2, pp . B61-B67.

* cited by examiner

REVERSE TIME MIGRATION IN ANISOTROPIC MEDIA WITH STABLE ATTENUATION COMPENSATION

CROSS-REFERENCE TO RELATED APPLICATION

This application claims the benefit of U.S. Provisional Patent Application 62/355,545 filed Jun. 28, 2016 entitled REVERSE TIME MIGRATION IN ANISOTROPIC MEDIA WITH STABLE ATTENUATION COMPENSATION, the entirety of which is incorporated by reference herein.

FIELD OF THE INVENTION

Exemplary embodiments described herein pertain generally to the field of geophysical prospecting, and more particularly to geophysical data processing in pursuit of hydrocarbon extraction. Exemplary embodiments can generate images of subsurface geological structures, which are used to enhance prospecting for hydrocarbons.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

An important goal of seismic prospecting is to accurately image subsurface structures commonly referred to as reflectors. Seismic prospecting is facilitated by obtaining raw seismic data during performance of a seismic survey. During a seismic survey, seismic energy is generated at ground level by, for example, a controlled explosion (or other form of source, such as vibrators), and delivered to the earth. Seismic waves are reflected from underground structures and are received by a number of sensors/receivers referred to as geophones. The seismic data received by the geophones is processed in an effort to create an accurate mapping of the underground environment. The processed data is then examined with a goal of identifying geological formations that may contain hydrocarbons.

Seismic energy that is transmitted in a relatively vertical direction into the earth is the most likely to be reflected by reflectors. Such energy provides meaningful information about subsurface structures. However, the seismic energy may be undesirably diffused by anomalies in acoustic impedance that routinely occur in the subsurface environment. Diffusion of seismic energy during a seismic survey may cause subsurface features to be incorrectly represented in the resulting seismic data.

Acoustic impedance is a measure of the ease with which seismic energy travels through a particular portion of the subsurface environment. Those of ordinary skill in the art will appreciate that acoustic impedance may be defined as a product of density and seismic velocity. Acoustic impedance is typically referred to by the symbol Z.

Seismic attenuation is a common place in the Earth model which leads to amplitude loss and phase distortion in the seismic data. Seismic data that are affected by attenuation without proper treatment may lead to poor imaging of subsurface structures within and below the attenuating media. In seismic processing, attenuation compensation can be either carried out in a pre-processing stage or during a final imaging stage.

Seismic waves attenuate for a variety of reasons as they travel in a subsurface environment. A quality metric (sometimes referred to a quality factor) Q is typically used to represent attenuation characteristics of underground formations. In general, Q is inversely proportional to seismic signal attenuation and may range from a value of zero to infinity. More specifically, Q is a dimensionless quality factor that is a ratio of the peak energy of a wave to the dissipated energy. As waves travel, they lose energy with distance and time due to spherical divergence and absorption. Such energy loss must be accounted for when restoring seismic amplitudes to perform fluid and lithological interpretations, such as amplitude versus offset (AVO) analysis. Structures with a relatively high Q value tend to transmit seismic waves with little attenuation. Structures that tend to attenuate seismic energy to a greater degree have lower Q values.

Q values associated with subsurface structures are used to mathematically alter seismic data values to more accurately represent structures in the subsurface environment. This process may be referred to as "Q migration" by those of ordinary skill in the art. During Q migration, a seismic data value representing travel of seismic energy through a subsurface structure having a relatively low Q value may be decreased in amplitude and narrowed in spectrum to a greater degree than a data value representing travel of seismic energy through a subsurface structure having a relatively high Q value. Altering the amplitude and phase of data associated with low Q values takes into account the larger signal attenuation that occurs when seismic energy travels through structures having a relatively low Q value.

A crude attenuation compensation can be done as a pre-processing step by applying a global inverse Q-filter (usually 1D) to seismic data (Bickel and Natarajan, 1985; Hargreaves and Calvert, 1991; Wang, 2002), where corrections of both amplitude and phase, or either one of the two, are possible.

Compensating for attenuation during imaging allows for a more accurate and physical correction based on a Q model that can vary spatially. The Q model is usually provided by the users using Q tomography or some other field measurements. The Q compensation can be implemented in Kirchhoff depth migration (KDMIG) (Traynin et al., 2008), one-wave wave equation migration (WEM) (Mittet et al., 1995), and reverse time migration (RTM) (Deng and McMechan, 2008), all aiming for enhanced image quality by correcting reflector depth and improving illumination.

Q compensation in KDMIG and WEM is usually stable due to the fact that both methods have direct control over frequencies. On the contrary, time-domain RTM, which does not usually have control over frequencies, often suffers from exponential growth of energy in the high frequencies during Q compensation.

Conventionally, Q-compensated migration can be implemented in a few ways, which are discussed below.

Kirchhoff Depth Migration. At each imaging point, data are filtered (F) prior to applying the imaging condition using the following equation:

$$F(t^*(t)) = \exp\left\{\mp \omega \frac{t^*(t)}{2} \pm i\omega \frac{t^*(t)}{\pi} \ln \frac{\omega}{\omega_0}\right\} \qquad (1)$$

where t is the real-valued travel time, $\omega$ is angular frequency, $\omega_0$ is angular frequency, and t*(t) is the attenuated traveltime defined by:

$$t^*(t) = \int \frac{Q^{-1}(s)}{v(s)} ds = \frac{t}{Q_{\text{eff}}(t)} \qquad (2)$$

which is based on integrating velocity v and Q along the rays s, wherein t is travel time and $Q_{\text{eff}}$ is the effective attenuation quality factor; but here, a ray-shooting strategy from the surface is used, as in standard Kirchhoff migration. (Cavalca et al., 2013).

Wave Equation Migration. Wave equation migration (Valenciano, et al. 2011) uses the following formula to downward continue wavefields:

$$P(z+\Delta z;\omega,k_x,k_y) = P(z;\omega,k_x,k_y)\exp(\pm ik_z \Delta z) \qquad (3)$$

where P is pressure wavefield, $\omega$ is angular frequency, and the k's are the wavenumbers in the Cartesian x, y, and z directions. For visco-acoustic media, the normalized vertical wavenumber is given by:

$$s_{zQ} = \sqrt{\left(1 + \frac{i}{2Q}\right)^2 - s_x^2 - s_y^2} \qquad (4)$$

where $$s_{zQ} = \frac{v(\omega)}{\omega}k_{zQ},\ s_{zQx} = \frac{v(\omega)}{\omega}k_x,\ \text{and}\ s_{zQy} = \frac{v(\omega)}{\omega}k_y.$$

The frequency dependent velocity is $$v(\omega) = v(\omega_r)\left[1 - \frac{1}{\pi Q(\omega_r)}\ln\left(\frac{\omega}{\omega_r}\right)\right]^{-1}.$$

Here $Q(\omega_r)$ and $v(\omega_r)$ are respectively the quality factor and phase velocity at a reference frequency.

RTM. Zhang (2010) has formulated a two-way wave equation for visco-acoustic media to be $$P_{tt} + \frac{\Phi}{Q}P_t = \Phi^2 P = 0 \qquad (5)$$

where the subscripts t and tt denotes first- and second-order time derivatives, $\Phi$ is a pseudo-differential operator in the space domain defined by $$\Phi = \left(\frac{\sqrt{(-v_0^2 \nabla^2)}}{\omega_0^\gamma}\right)^{\frac{1}{1-\gamma}},$$

$v_0$ is the velocity defined at a reference frequency $\omega_0$, and $\nabla^2$ is the Laplacian operator and $$\gamma = \frac{1}{\pi}\tan^{-1}\left(\frac{1}{Q}\right).$$

Equation 5 can be modified to model amplitude-loss only as $$P_{tt} + \frac{\Phi}{Q}P_t - v^2 \nabla^2 P = 0 \qquad (6)$$

and phase distortion only as $$P_{tt} + \Phi^2 P = 0 \qquad (7)$$

The formulation in equation 7 was later extended to VTI (vertical transversely isotropic) media by Suh et al. (2012). Xie et al. (2015) proposed to implement attenuation compensating in TTI (tilted transversely isotropic) RTM based on the following visco-acoustic wave equation in TTI anisotropy:

$$(i\omega)^{2-2\gamma}\begin{pmatrix}P\\R\end{pmatrix} = \qquad (8)$$

$$\frac{v_0^2 \cos^2 \frac{\pi\gamma}{2}}{\omega_0^{2\gamma}}\begin{pmatrix}1+2\varepsilon & \sqrt{1+2\delta}\\\sqrt{1+2\delta} & 1\end{pmatrix}\begin{pmatrix}G_{xx}+G_{yy} & 0\\0 & G_{zz}\end{pmatrix}\begin{pmatrix}P\\R\end{pmatrix}$$

where P and R are the pressure and auxiliary wavefields, $\varepsilon$ and $\delta$ are the Thomsen anisotropy parameters, $G_{xx}$, $G_{yy}$ and $G_{zz}$ are rotated differential operators to account for tilting of symmetry axis.

SUMMARY

A method, including: obtaining Earth models including velocity, anisotropy, and attenuation; reconstructing a source wavefield using the Earth models; reconstructing a receiver wavefield using the Earth models, wherein the reconstructing the source wavefield and the receiver wavefield each include applying an attenuation operator that increases an amplitude of down-going wavefields within an attenuation body and that decreases an amplitude of up-going wavefields within the attenuation body; applying an imaging condition to the source wavefield and receiver wavefield for a plurality of shots; and generating a subsurface image by stacking images for the plurality of shots.

In the method, the obtaining the Earth models can include generating the Earth models from surface seismic data or borehole seismic data, or a combination of surface seismic data and borehole seismic data.

In the method, the reconstructing of the source wavefield and the receiver wavefield each can include applying a frequency threshold, above which amplitude is not increased and not decreased by the attenuation operator.

In the method, the attenuation body can represent a pocket of natural gas.

The method of claim 1, wherein the attenuation body represents a salt body.

The method of claim 1, wherein reconstructing the source wavefield and the receiver wavefield each include: determining a visco-acoustic anisotropic wavefield propagation velocity from a combination of a constant Q model formulation that expresses frequency dependent velocity and allows for separate treatment of phase and amplitudes of seismic waves and an anisotropic phase velocity that expresses either compressional (P-) or shear (S-) wave propagation.

The method can further include: conducting a seismic survey, wherein surface seismic data or borehole seismic data are acquired using sources and receivers.

The method can further include: prospecting for hydrocarbons using the subsurface image.

In the method, the attenuation operator can be a phase-direction dependent weighting function.

In the method, reconstructing a receiver wavefield includes introducing anisotropic phase velocity to a visco-acoustic dispersion-relation.

The method can further include using the subsurface image to manage hydrocarbon production.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Exemplary embodiments are described herein. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

As a state-of-the-art imaging method, RTM is useful in the imaging of geologically complex areas, such as sub-salt, due to its utilization of full-wavefield information. Therefore, it is beneficial to incorporate attenuation compensation in RTM in order to produce more reliable images of complex areas with strong attenuation.

The present technological advancement provides a method of implementing Q compensated RTM in anisotropic media using low-rank approximation. Non-limiting examples of the present technological advancement can provide stable attenuation for geologically complex areas where the use of RTM is desirable (e.g., tilting beds (TTI) around salt and subsalt). The present technological advancement can also provide a proper means for Q-RTM with FWI models.

The present technological advancement can leverage low-rank approximation, a dispersion relation for visco-acoustic media, and a method for stable Q compensation. While each of these may be utilized together, each of them can be used individually or any two of the three can be used together.

Principle of Q-RTM

RTM can be described as a three-step procedure of: (1) forward propagation of a wavefield from the source through an appropriate Earth model (the source wavefield); (2) back-propagation of the measured data at the receiver location through the same model (the receiver wavefield); and (3) applying a suitable imaging condition, for example, the zero-lag cross correlation imaging condition or time-shift imaging condition. In attenuating media, seismic waves are attenuated in the subsurface. As the waves from the source propagate to reflectors and then reflect back to receivers, the accumulated wave path is reduced by a factor of $e^{-\alpha LD}$ $e^{-\alpha LU}$, wherein the LD and LU denote the down-going and up-going wavefield propagation distances and a is an attenuation coefficient. A corresponding correction factor can be determined and applied to obtain a corrected imaging condition (further information on the principle of Q-RTM is described in Zhu and Harris 2014).

Low Rank Approximation

A low-rank approximation implies selecting a small set of representative spatial locations and a small set of representative wavenumbers. The present technological advancement can use a low-rank one step wave extrapolation method (Sun and Fomel, 2013) to solve the wave equation for RTM. The wave-field extrapolation is formulated as $$p(x,t+\Delta t)=\int P(k,t)e^{ix\cdot k+i\omega(x,k)\Delta t}dk \approx \sum_{m=1}^{M}W(x,k_m) \\ (\sum_{n=1}^{N}a_{mn}(\int e^{ix\cdot k}W(x_n,k)P(k,t)dk)) \quad (9)$$

where $p(x,t+\Delta t)$ is the wavefield at a next time step $t+\Delta t$, $P(k,t)$ is the spatial Fourier transform of $p(x,t)$, k is the spatial wavenumber, and $e^{i\omega(x,k)\Delta t}$ denotes the wave extrapolation symbol obtained by solving for frequency ω in the dispersion relation. The first part of this equation is similar to a one-way wave equation migration operator and is directly solvable if the medium is constant. When the medium is heterogeneous, the second part of the equation is used to approximate the variability in this extrapolator. The approximation is efficiently done with low-rank approximation (Fomel et al., 2013) by decomposing the matrix $$W(x,k) = e^{i\omega(x,k)\Delta t} \approx \sum_{m=1}^{M} \sum_{n=1}^{N} W(x,k_m) a_{mn} W(x_n,k) e^{i\omega(x,k)\Delta t} \text{ as} \quad (10)$$

where x is the spatial location, k is the wavenumber, $W(x,k_m)$ are sampled columns, $W(x_n,k)$ are sampled rows, M is the number of column samples, N is the number of row samples and a is the middle matrix found by solving the optimization problem $$\min_{a} \left\| W(x,k) - \sum_{m=1}^{M} \sum_{n=1}^{N} W(x,k_m) a_{mn} W(x_n,k) \right\|$$

(Fomel et al., 2013). Equation 10 speeds up the computation of $p(x, t+\Delta t)$.

Dispersion Relation in Visco-Acoustically Anisotropic Media

Zhu and Harris (2014) derived a decoupled dispersion relation for isotropic media:

$$\frac{\omega^2}{c^2} = c_0^{2\gamma} \omega_0^{-2\gamma} \cos(\pi\gamma) |k|^{2\gamma+2} + (i\omega) c_0^{2\gamma-1} \omega_0^{-2\gamma} \sin(\pi\gamma) |k|^{2\gamma+1} \quad (11)$$

where $\omega_0$ is the reference frequency, k is the wave number, $\omega$ is frequency, and $c_0$ is the seismic velocity at the reference frequency $\omega_0$, $$\gamma = \frac{1}{\pi} \tan^{-1}\left(\frac{1}{Q}\right) \text{ and}$$

$$c^2 = c_0^2 \cos^2(\pi\gamma/2).$$

The first part of the right-hand-side of equation (10) is the phase-dispersion dominant term and the second part of the right-hand-side is the amplitude-loss dominant term. The decoupling in this dispersion relation (equation 10) allows for the freedom to correct phase and compensate amplitudes separately and independent of each other.

In acoustic and viscoacoustic media there is no elastic anisotropy. The present work introduces the notion of pseudo-acoustic anisotropy to the constant-Q wave equation in order to model anisotropic wave propagation through attenuating media using the visco-acoustic wave equation derived by Zhu and Harris (2014).

In anisotropic media, the expression of the phase velocity $c_0$ depends on the type of anisotropy, and it may also admit various forms (tilted transversely isotropic, orthorhombic, etc). For example, the acoustic approximation in tilted transversely isotropic media can be used (Alkhalifah, 1998; Fomel, 2004), which is:

$$c_0(x,k) = \sqrt{\frac{1}{2}(v_x^2 \tilde{n}_x^2 + v_z^2 \tilde{n}_z^2) + \frac{1}{2}\sqrt{(v_x^2 \tilde{n}_x^2 + v_z^2 \tilde{n}_z^2)^2 - \frac{8\eta}{1+2\eta} v_x^2 v_z^2 \tilde{n}_x^2 \tilde{n}_z^2}} \quad (12)$$

where $v_x$ is the P-wave phase velocity perpendicular to the symmetry axis (i.e., in the symmetry plane), $v_z$ is the P-wave phase velocity along the symmetry axis, $\eta$ is the anellipticity parameter (Alkhalifah and Tsvankin, 1995), and $\tilde{n}_x$, $\tilde{n}_z$ are phase directions projected onto tilted coordinates $\tilde{n}_x = n_x \cos\theta + n_z \sin\theta$ and $\tilde{n}_z = n_z \cos\theta - n_x \sin\theta$, where $n_x$, $n_z$ denote the original phase directions. When equation (12) is inserted into equation (11), a formulation is obtained that describes the wave propagation in visco-acoustic TTI media. Combination of other formulations of phase velocity and the visco-acoustic dispersion relation (equation 11) for wavefield simulation is straightforward to those of ordinary skill in the art in light of the present teachings herein.

Stable Q Compensation

The present disclosure also provides for a stable attenuation compensation operator in wavefield simulation during RTM. Assuming unit length of wave propagation, amplitude attenuation and compensation operators are calculated as $e^{-\alpha}$ and $e^{\alpha}$, respectively. Here, the term a links directly to the spatially varying attenuation. It is obvious that attenuating the wavefield is a stable operation, but compensating the wavefield can be unstable because of the exponential growth of the wavefield.

Wavenumber domain tapering is usually used to stabilize the wavefield compensation (Zhu et al., 2014; Sun et al., 2015). The application of the tapering filter, however, could lead to dispersion artifacts in the computed wavefield, which could potentially contaminate the final image. The present technological advancement can use an anisotropic attenuation/compensation operator combined with a thresholding technique to stabilize the Q-compensated wavefield without introducing any artifacts. First, to avoid the internal reflections from being constantly amplified, a Q-compensation operator for downward traveling waves is applied while applying an attenuation operator to the upward traveling waves. This is analogous to the imaging condition of one-way wave equation migration, where the image is constructed by the transmitted energy. Mathematically, the anisotropic attenuation/compensation can be expressed as a phase-direction dependent weighting function:

$$w(k) = \sin\left(\frac{k_z}{|k|} \frac{\pi}{2}\right). \quad (13)$$

As we can see the weighting factor falls in the range of [−1,1]. Therefore, when this term is multiplied to the term α, we get a compensation factor $e^{w(k)\alpha}$. The weighted compensation will compensate the down-going wavefield and attenuates the up-going wavefield because the compensation factor becomes $e^{\alpha}$ and $e^{-\alpha}$ for down- and up-going wavefields, respectively. The horizontally propagating wavefield will neither be compensated nor attenuated because the weighting factor is 0 and the compensation factor becomes 1. In fact, the weighting factor w(k) can take other forms as long as it satisfies the desired directional-dependent behavior that is described here. Second, to keep the high-frequency component of the wavefield from gaining unrealistically high amplitude, a frequency thresholding above which amplitude is not compensated can be applied and only phase is corrected. In this way, the wavenumber domain tapering can be avoided and the present technological advancement produces an artifact free wavefield with reasonably accurate Q compensation (most accurate for small incident angle and low wavenumber).

The present technological advancement provides three major advantages. First, the Q compensation operator (equation 13) has remarkable numerical stability and is capable of extrapolating waves using very large time steps. Second, the wave extrapolation symbol (equation 10) can be a complex-valued function, allowing for complex-valued phase function such as the one prescribed by the aforementioned dispersion relation (equation 11). Third, the wavefield is analytical, containing either positive or negative frequency, so that the sign of the wavenumber indicates the wave propagation direction, which enables an efficient implementation of the stable Q-compensation operator.

Figure 1:
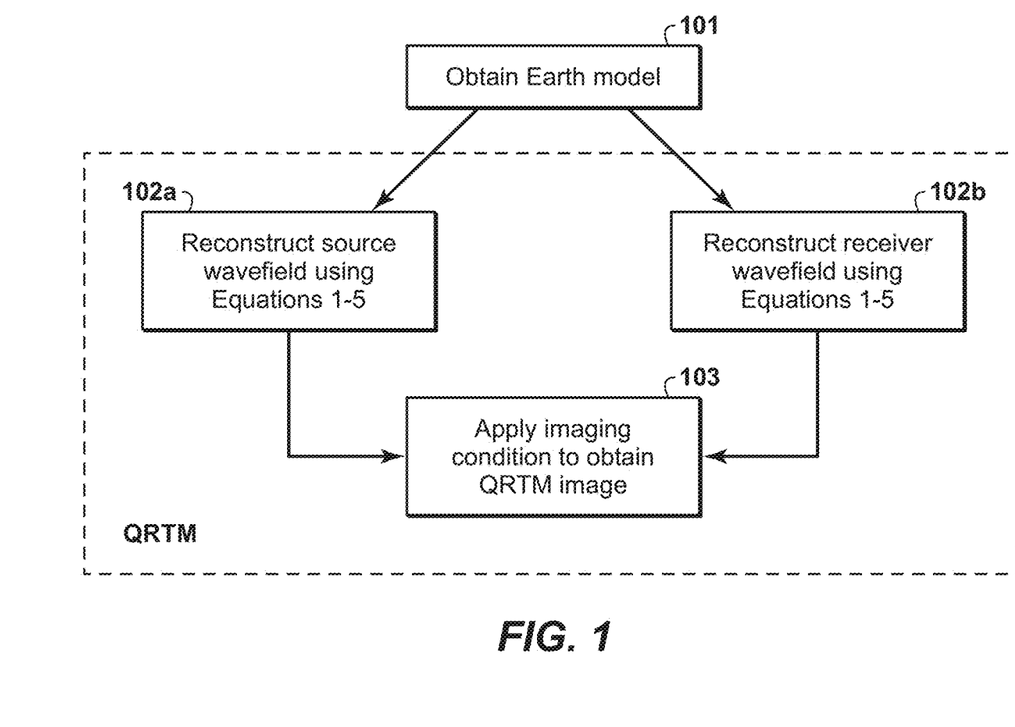
FIG. 1 is a flow chart that illustrates a method embodying the present technological advancement.

FIG. 1 illustrates an exemplary method of implementing the present technological advancement. In step 101, an Earth model is obtained. An Earth model is a geometric model of a portion of the Earth that may also contain material properties. An Earth model can be derived from integrating an estimation of model parameters (velocity, anisotropy, attenuation, etc.) that can be derived from surface seismic data and direct measurements of model parameters (velocity, anisotropy, attenuation, etc.) that are obtained from borehole seismic data. Those of ordinary skill in the art know various ways an earth model can be constructed or obtained.

Step 102A includes reconstructing the source wavefield. Step 102B includes reconstructing the receiver wavefield. These steps are further described with respect to FIG. 2.

Step 103 includes applying an image condition to obtain a QRTM image. The imaging condition can be applied to a plurality of shots (i.e., activations of seismic sources), wherein a subsurface image is created for each of the plurality of shots. Then, those subsurface images can be stacked to generate a final subsurface image. The QRTM image is a subsurface image of the Earth, and can be used to manage hydrocarbons. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Figure 2:
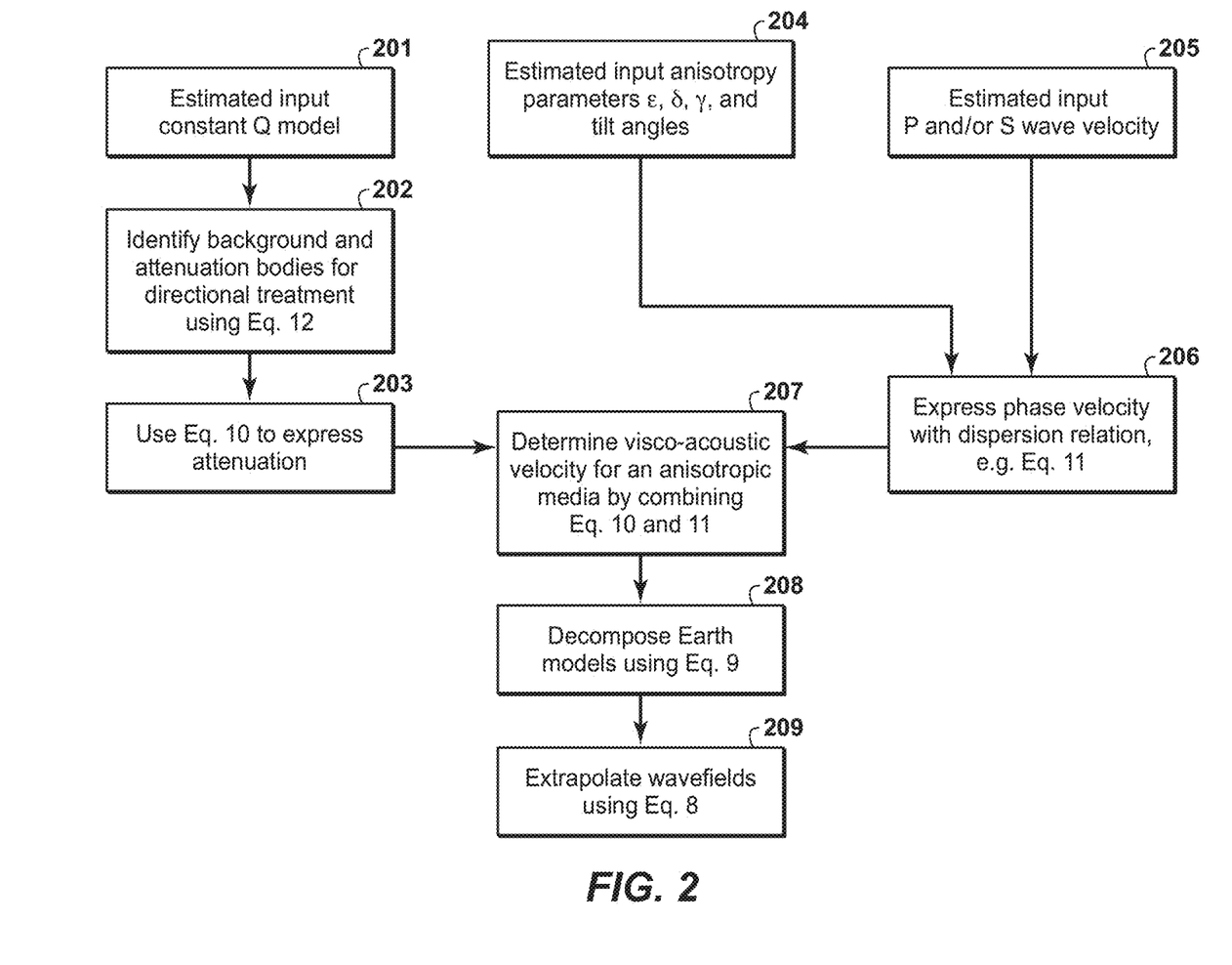
FIG. 2 is a flow chart that illustrates a method embodying the present technological advancement.
Figure 7A:
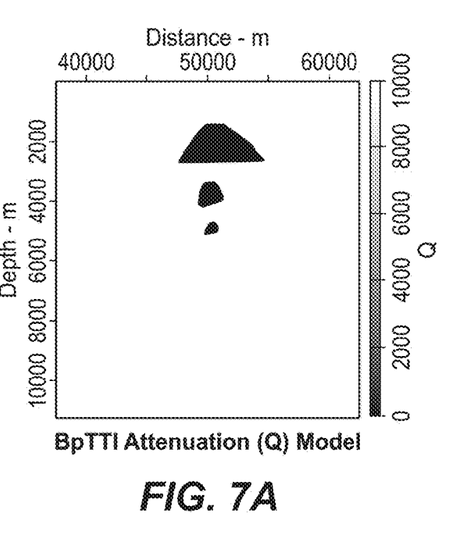
FIG. 7A illustrates a Q model.
Figure 7B:
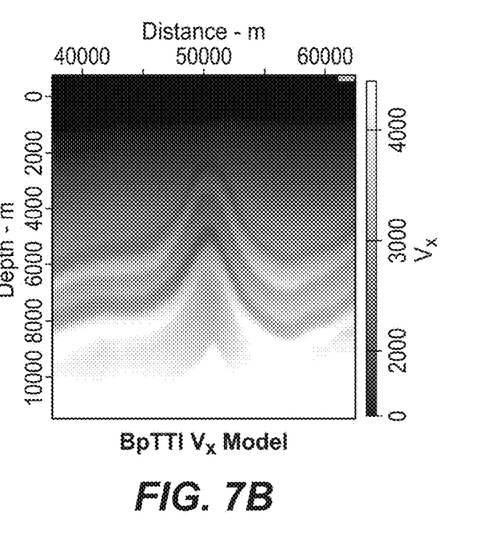
FIG. 7B illustrates horizontal P wave velocity.
Figure 7C:
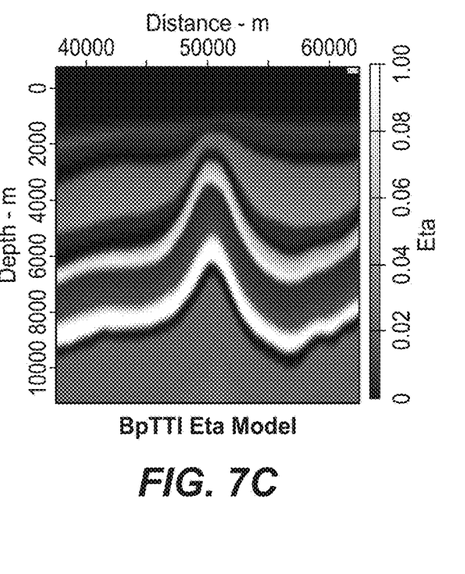
FIG. 7C illustrates anisotropy parameter II.
Figure 7D:
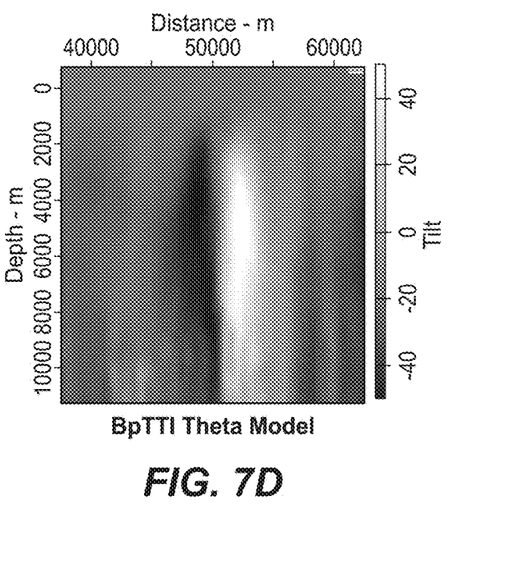
FIG. 7D illustrates tilt of the reflectors.

FIG. 2 illustrates further details of steps 102A and 102B. The method of FIG. 2 is applicable to both steps 102A and 102B. Step 201 includes estimating an input constant (in time) Q model from the Earth model. FIGS. 3D, 5B, and 7A are examples of constant Q models.

Step 202 includes identifying background and attenuation bodies (e.g., gas pockets, salt bodies) for directional treatment, wherein weighted compensation will compensate a down-going wavefield and attenuate an up-going wavefield because the compensation factor becomes $e^{\alpha}$ and $e^{-\alpha}$ for down- and up-going wavefields, respectively. A horizontally propagating wavefield will neither be compensated nor attenuated because the weighting factor is 0 and the compensation factor becomes 1. In regards to directional treatment of the amplitude compensation term in equation 11, wave propagation in background attenuation are compensated downwards (i.e., amplitude of down-going waves is increased) while wave propagation through strong attenuation bodies (gas pockets) are compensated downwards (e.g., amplitude of down-going waves through the strong attenuation body is increased and amplitude of up-going waves through the strong attenuation body is decreased).

Step 203 includes using equation 11 to express attenuation (1/Q).

Step 204 includes estimating input anisotropy parameters ($\epsilon$, $\delta$, and $\gamma$; Thomsen parameters) and tilt angles from the earth model. The delta parameter, the short offset effect, captures the relationship between the velocity required to flatten gathers (the normal moveout velocity) and the zero-offset average velocity as recorded by checkshots. The epsilon parameter, the long offset effect, is the fractional difference between vertical and horizontal P velocities; i.e., it is the parameter usually referred to as the anisotropy of a rock. The gamma parameter, the shear wave effect, relates a horizontal shear wave with horizontal polarization to a vertical shear wave.

Step 205 includes estimating input P and/or S wave velocity from the Earth model.

Step 206 includes determining the phase velocity in anisotropic media, for example, using equation 12.

Step 207 includes determining the visco-acoustic dispersion-relation for an anisotropic media by combining equations 11 and 12.

Step 208 includes decomposing the wave extrapolation symbol using equation 10 for a lowrank representation.

Step 209 includes extrapolating wavefields using equation 9, and time marching the wavefields to simulate acoustic seismic wave propagation.

Wavefield Simulation Example

Figure 3A:
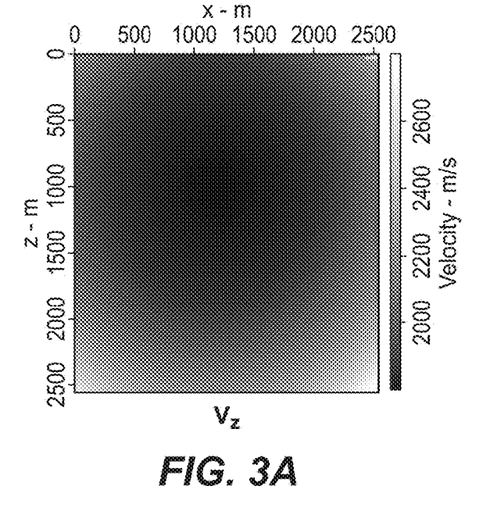
FIG. 3A illustrates the vertical of phase velocity of a TTI medium.
Figure 3B:
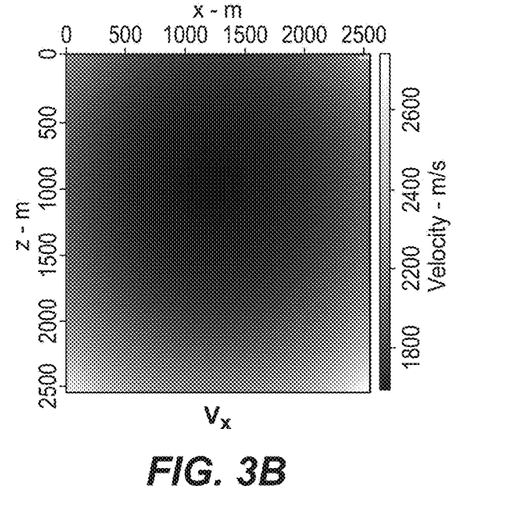
FIG. 3B illustrates the horizontal of phase velocity of the TTI medium.
Figure 3C:
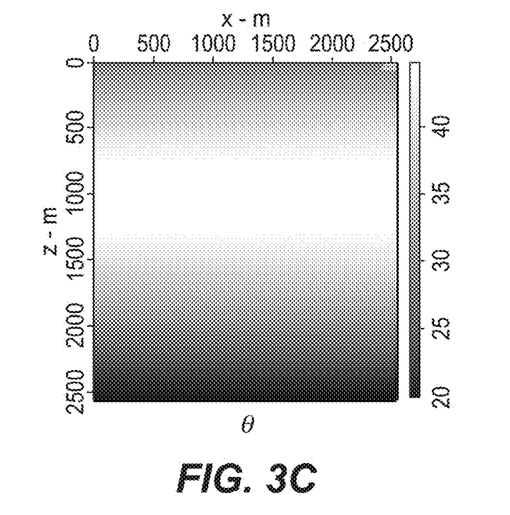
FIG. 3C illustrates the tilt angle of the TTI medium.
Figure 3D:
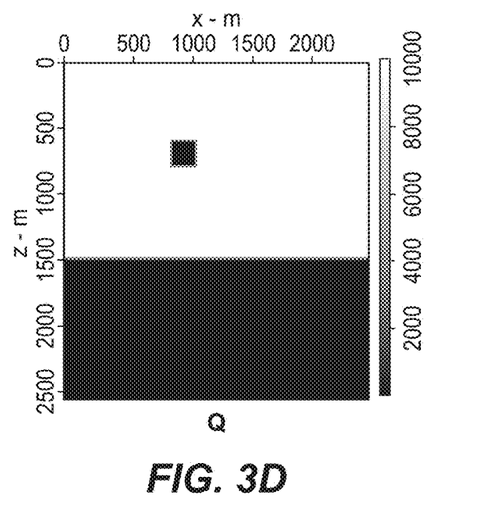
FIG. 3D illustrates a quality factor Q model.

FIGS. 3A, 3B, 3C, and 3D are a non-limiting examples of Earth models, where FIG. 3A and FIG. 2B are the vertical and horizontal phase velocity of a 2D TTI medium. FIG. 3C is the tilt angle of the TTI medium and FIG. 2D is the Q (inverse of attenuation factor) model. The Earth models feature a very heterogeneous velocity model and both large and small scale Q anomalies. The Q value from a depth of 1500 to the maximum depth of the Q model in FIG. 3D is 40 and the small cube around a depth of 500 has a Q value of 10.

Figure 4A:
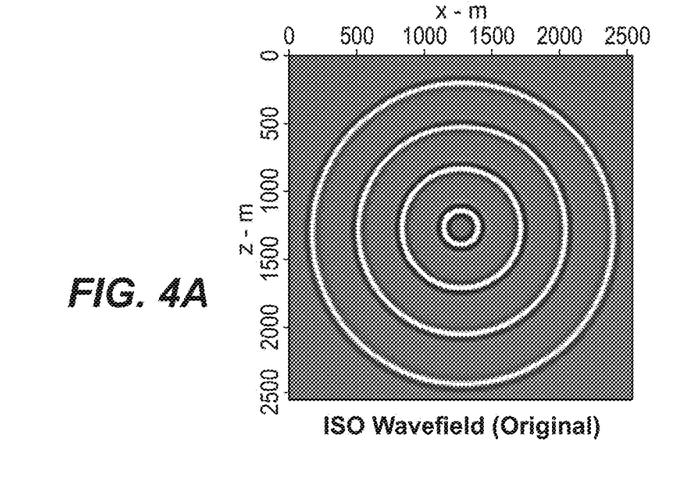
FIG. 4A illustrates an isotropic wavefield snapshot at four discrete time steps without any attenuation.
Figure 4B:
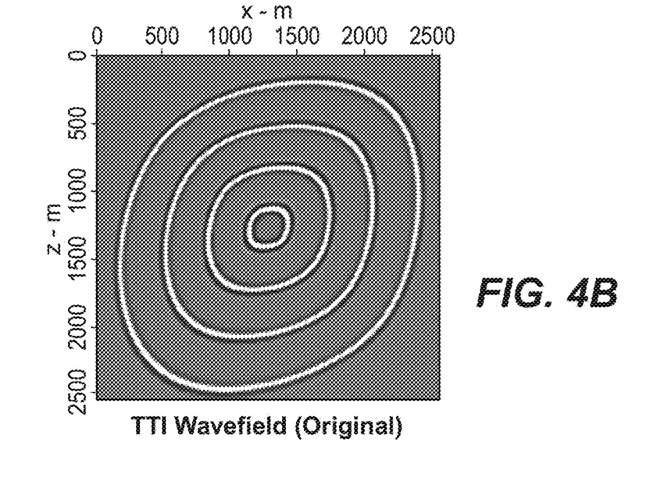
FIG. 4B illustrates a TTI wavefield snapshot at four discrete time steps without any attenuation.
Figure 4C:
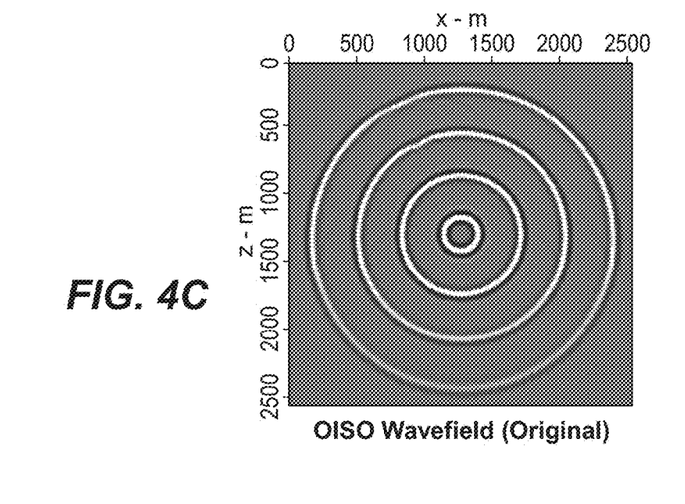
FIG. 4C illustrates an isotropic wavefield snapshot at four discrete time steps with attenuation.
Figure 4D:
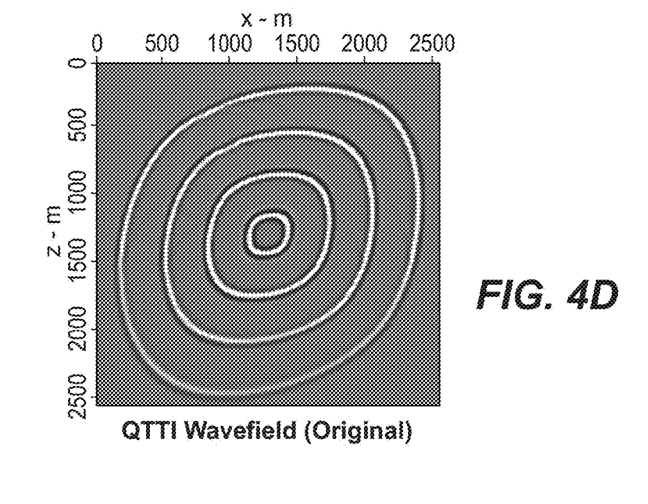
FIG. 4D illustrates a TTI wavefield snapshot at four discrete time steps with attenuation.

FIGS. 4A, 4B, 4C, and 4D illustrate non-limiting examples of a simulated wavefield snapshot using equation 8 at four discrete time steps using a low-rank one-step wave extrapolation. FIGS. 4A and 4B are isotropic and TTI wavefields without any attenuation, respectively. FIGS. 4C and 4D are the wavefields in FIGS. 4A and 4B with attenuation, respectively. It can be clearly seen that attenuation in the model (FIG. 3D) has led to both amplitude loss and phase/arrival time delay.

Figure 5A:
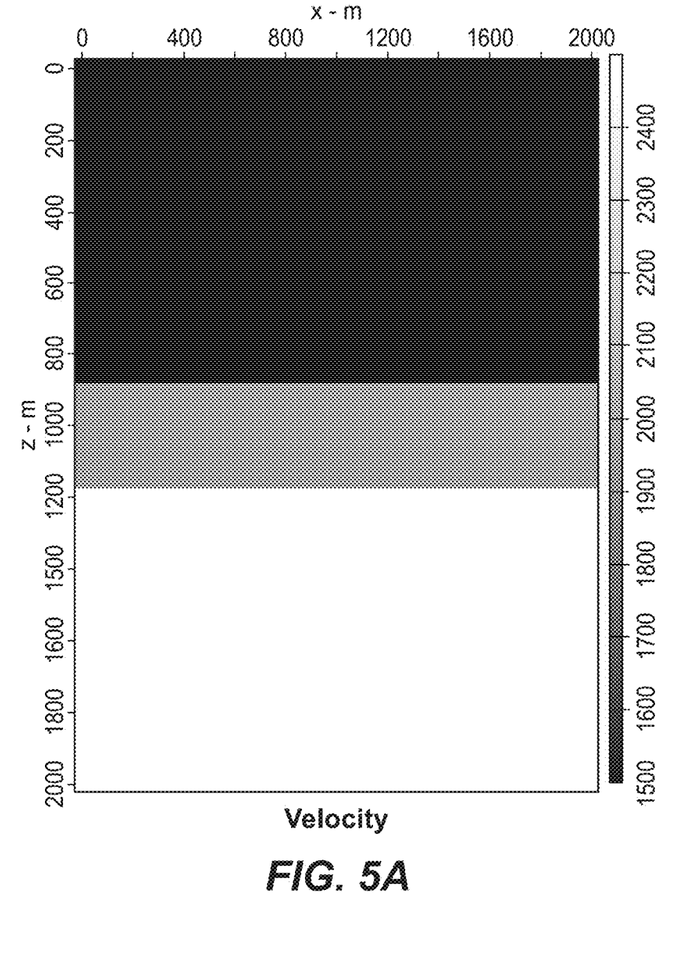
FIG. 5A illustrates an Earth model of P-wave velocity.
Figure 5B:
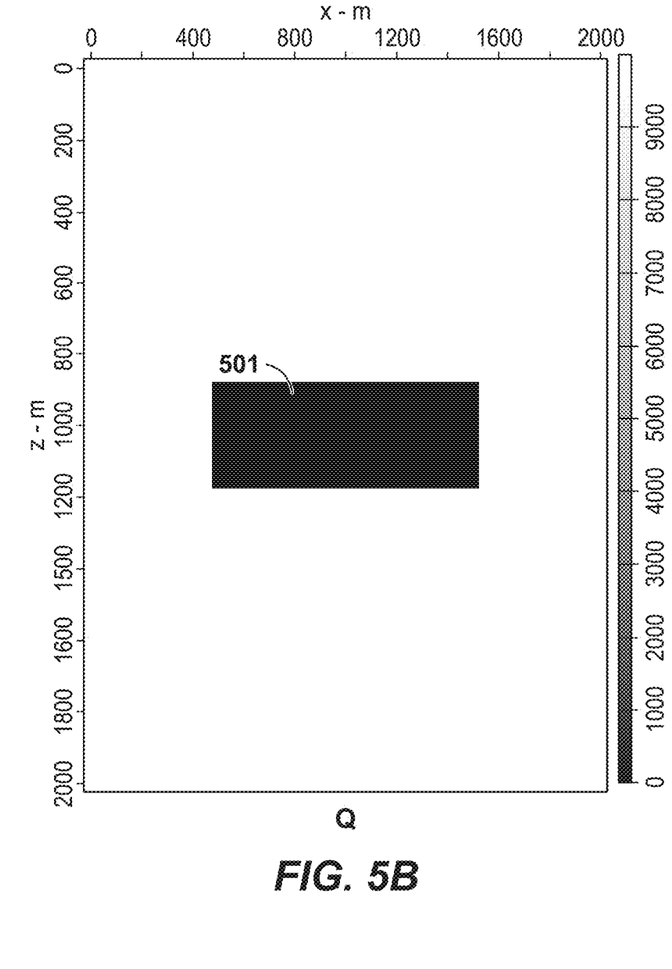
FIG. 5B illustrates an Earth model with quality factor Q.
Figure 6A:
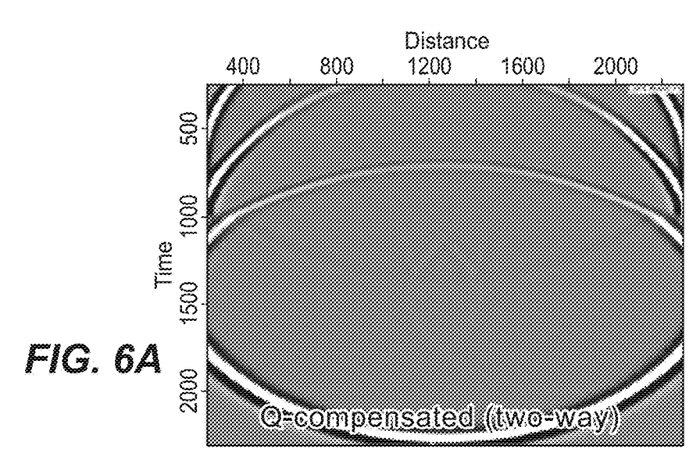
FIG. 6A illustrates simulated wavefields with Q compensation computed with isotropic Q compensation at time step one.
Figure 6B:
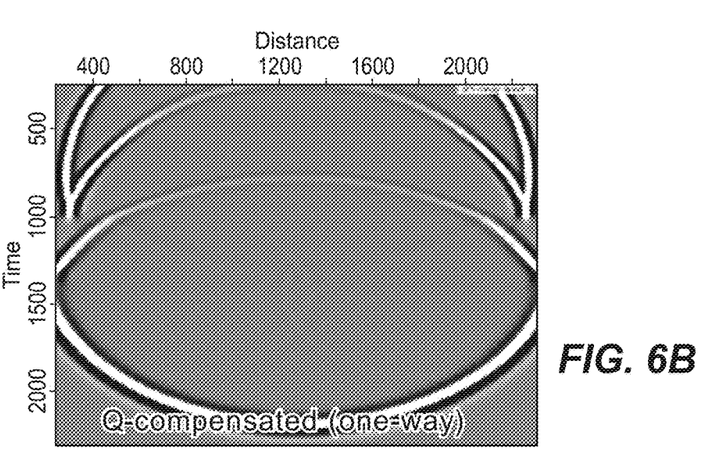
FIG. 6B illustrates simulated wavefields with Q compensation computed according to the present technological advancement at time step one.
Figure 6C:
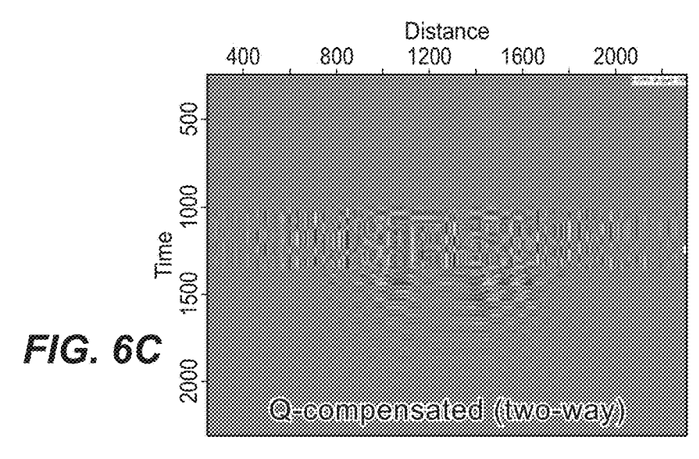
FIG. 6C illustrates simulated wavefields with Q compensation computed with isotropic Q compensation at time step two.
Figure 6D:
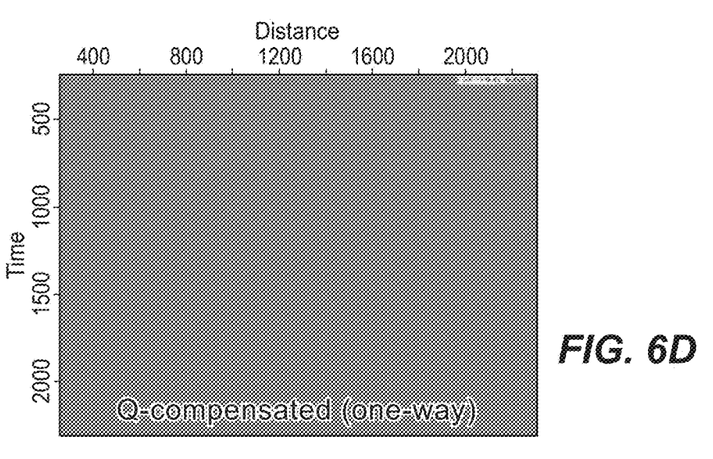
FIG. 6D illustrates simulated wavefields with Q compensation computed according to the present technological advancement at time step two.

FIGS. 5A and 5B illustrate Earth models with (A) P-wave velocity and (B) quality factor Q that are used to illustrate conventional and method of the present technological advancement to compensate for amplitude loss. 501 indicate an attenuation body, such as a pocket of natural gas. FIGS. 6A, 6B, 6C, and 6D illustrate simulated wavefields after Q compensation: 6A and 6C being computed by applying compensation isotropically (no distinguishing between up- and down-going wavefields); and 6B and 6D being computed by applying compensation according to equation 12. FIGS. 6A and 6B are wavefields at 1 second, and FIGS. 6C and 6D are wavefields at 2 seconds. At 1 second, both compensation schemes are stable. However, at later times such as at 2 seconds, the wavefield using two-way compensation becomes unstable, while the wavefield using one-way compensation remains stable. The two-way compensation has over amplified the wavefield when the wavefield bounces within the middle velocity and Q contrast (501). The one-way compensation of the present technological advancement has a balanced amplification and attenuation leading to stable wavefield propagation.

Figure 6E:
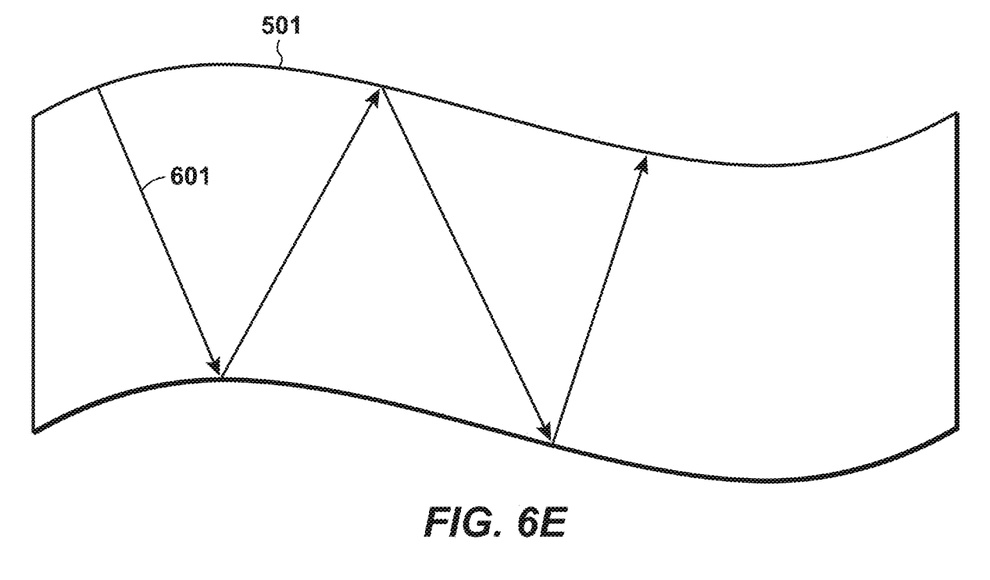
FIG. 6E illustrates the reflection inside an attenuation body.

FIG. 6E is a section of attenuation body 501, wherein wave 601 is illustrates how the wave bounces within the attenuation body 501. The two-way compensation over amplifies the wavefield because it is amplifying both the up-going and down-going waves within attenuation body 501. The one-way compensation of the present technological advancement, using equation 12, will compensate the down-going wavefield fully and attenuate the up-going wavefield fully because the compensation factor becomes ea and e' for down- and up-going wavefields, respectively.

Figure 8A:
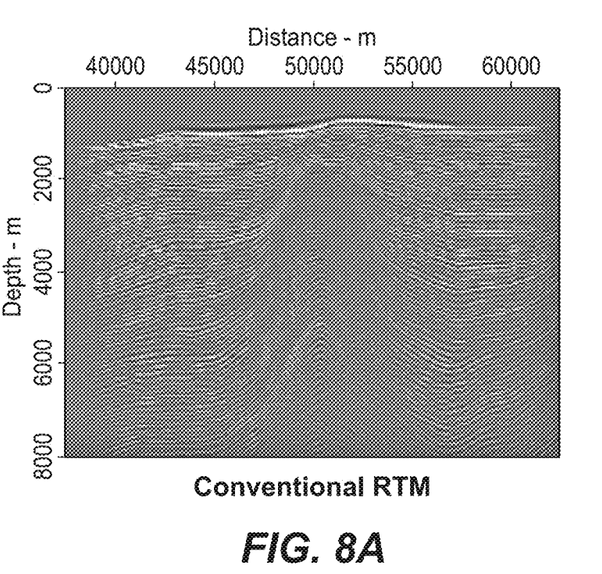
FIG. 8A illustrates a subsurface image generated with conventional RTM without Q compensation.
Figure 8B:
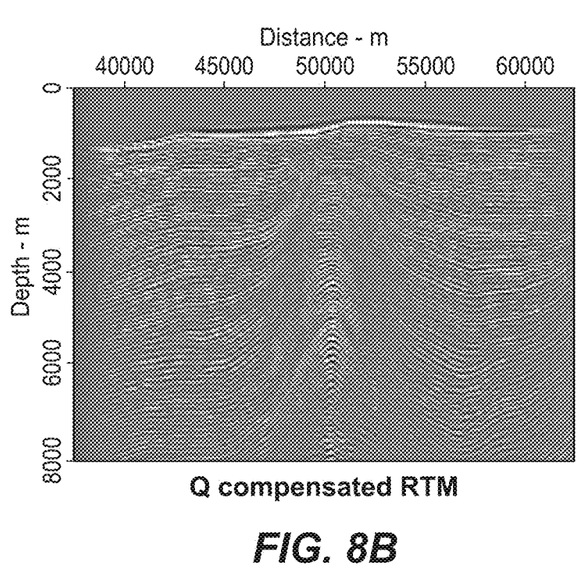
FIG. 8B illustrates a subsurface image generated with the present technological advancement.

FIGS. 7A, 7B, 7C, and 7D illustrate 2D synthetic Earth models used for an RTM workflow with the present technological advancement. FIGS. 7A to 7D are the Q model, horizontal P-wave velocity, anisotropy parameter η, and the tilt angle of the reflectors, respectively. FIGS. 8A and 8B illustrate a comparison of RTM images without (A) and with (B) the Q compensation using the present technological advancement. It is clear from a comparison of FIGS. 8A and 8B that a proper Q migration is a useful improvement over conventional technology in generating a geologically reliable subsurface image that is representative of the reflectivity of the Earth.

In all practical applications, the present technological advancement must be used in conjunction with a computer, programmed in accordance with the disclosures herein. Any step in any of the methods discussed herein can be implemented with a computer. Preferably, in order to efficiently perform RTM, the computer is a high performance computer (HPC), known as to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

REFERENCES

The following references are hereby incorporated by reference in their entirety:
Alkhalifah, T., 1998, Acoustic approximations for processing in transversely isotropic media: Geophysics, 63, 623-631, doi: 10.1190/1.1444361;
Alkhalifah, T., and I. Tsvankin, 1995, Velocity analysis for transversely isotropic media: Geophysics, 60, 1550-1566, doi: 10.1190/1.1443888;
Bickel, S. H., and R. R. Natarajan, 1985, Plane-wave Q deconvolution: Geophysics, 50, 1426-1439, doi: 10.1190/1.1442011;
Cavalca, M., R. Fletcher, and M. Riedel, 2013, Q-compensation in complex media—Ray-based and wavefield extrapolation approaches: 83rd Annual International Meeting, SEG, Expanded Abstracts, 3831-3835;
Deng, F., and G. A. McMechan, 2008, Viscoelastic true-amplitude prestack reverse-time depth migration: Geophysics, 73, no. 4, S143-S155, doi: 10.1190/1.2938083;
Fomel S., 2004, On anelliptic approximations for qP velocities in VTI media: Geophys. Prosp., 52, 247-259, doi: 10.1111/j.1365-2478.2004.00413.x;
Fomel, S., L. Ying, and X. Song, 2013, Seismic wave extrapolation using lowrank symbol approximation: Geophysical Prospecting, 61, 526-536, doi: 10.1111/j.1365-2478.2012.01064.x;
Hargreaves, N. D., and A. J. Calvert, 1991, Inverse Q filtering by Fourier transform: Geophysics, 56, 519-527, doi: 10.1190/1.1443067;
Kjartansson, E., 1979, Constant-Q wave propagation and attenuation: Journal of Geophysical Research, 84, 4737-4748, doi: 10.1029/JB084iB09p04737;
Mittet, R., R. Sollie, and K. Hokstad, 1995, Prestack depth migration with compensation for absorption and dispersion: Geophysics, 60, 1485-1494, doi: 10.1190/1.1443882;
Suh, S., K. Yoon, J. Cai, and B. Wang, 2012, Compensating visco-acoustic effects in anisotropic reverse-time migration: 82nd Annual International Meeting, SEG, Expanded Abstracts, 1-5;
Sun, J., and S. Fomel, 2013, Low-rank one-step wave extrapolation: 83rd Annual International Meeting, SEG, Expanded Abstracts, 3905-3910;
Sun, J., T. Zhu, and S. Fomel, 2015, Viscoacoustic modeling and imaging using low-rank approximation: Geophysics, 80, no. 5, A103-A108, doi: 10.1190/geo2015-0083.1;
Traynin, P., J. Liu, and J. M. Reilly, 2008, Amplitude and bandwidth recovery beneath gas zones using Kirchhoff prestack depth Q-migration: 78th Annual International Meeting, SEG, Expanded Abstracts, 2412-2416;
Valenciano, A. A., N. Chemingui, D. Whitmore, and S. Brandsberg-Dahl, 2011, Wave equation migration with attenuation and anisotropy compensation: 81st Annual International Meeting, SEG, Expanded Abstracts, 232-236;
Wang, Y., 2002, A stable and efficient approach of inverse Q filtering: Geophysics, 67, 657-663, doi: 10.1190/1.1468627.
Xie, Y., J. Sun, Y. Zhang and J. Zhou, 2015, Compensating for visco-acoustic effects in TTI reverse time migration: 85th Annual International Meeting, SEG, Expanded Abstrcts, 3996-4001.
Zhang, Y., P. Zhang, and H. Zhang, 2010, Compensating for viscoacoustic effects in reverse-time migration: 80th Annual International Meeting, SEG, Expanded Abstracts, 3160-3164;
Zhu, T., and J. M. Harris, 2014, Modeling acoustic wave propagation in heterogeneous attenuating media using decoupled fractional Laplacians: Geophysics, 79, no. 3, T105-T116, doi: 10.1190/geo2013-0245.1; and
Zhu, T., J. M. Harris, and B. Biondi, 2014, Q-compensated reverse-time migration: Geophysics, 79, no. 3, S77-S87, doi: 10.1190/geo2013-0344.1.

What is claimed is:
1. A method, comprising:
obtaining Earth models including velocity, anisotropy, and attenuation;
reconstructing a source wavefield using the Earth models;
reconstructing a receiver wavefield using the Earth models,
wherein the reconstructing the source wavefield and the receiver wavefield each include applying an anisotropic attenuation and compensation operator that (a) increases an amplitude of down-going wavefields within an attenuation body, (b) decreases an amplitude of up-going wavefields within the attenuation body, and (c) comprises a phase-direction dependent weighting function $w(k)$ having the form

$$w(k) = \sin\left(\frac{k_z}{|k|}\frac{\pi}{2}\right)$$

where k is the spatial wavenumber;

applying an imaging condition to the source wavefield and receiver wavefield for a plurality of shots;

generating a subsurface image by stacking images for the plurality of shots; and prospecting for hydrocarbons using the subsurface image.

2. The method of claim 1, wherein the obtaining the Earth models includes generating the Earth models from surface seismic data or borehole seismic data, or a combination of surface seismic data and borehole seismic data.

3. The method of claim 1, wherein the reconstructing of the source wavefield and the receiver wavefield each includes applying a frequency threshold, above which amplitude is not increased and not decreased by the anisotropic attenuation and compensation operator.

4. The method of claim 1, wherein the attenuation body represents a pocket of natural gas.

5. The method of claim 1, wherein the attenuation body represents a salt body.

6. The method of claim 1, wherein reconstructing the source wavefield and the receiver wavefield each comprise:

determining a visco-acoustic anisotropic wavefield propagation velocity from a combination of a constant Q model formulation that expresses frequency dependent velocity and allows for separate treatment of phase and amplitudes of seismic waves and an anisotropic phase velocity that expresses either compressional (P-) or shear (S-) wave propagation.

7. The method of claim 2, further comprising:

conducting a seismic survey, wherein surface seismic data or borehole seismic data are acquired using sources and receivers.

8. The method of claim 1, wherein reconstructing a receiver wavefield includes introducing anisotropic phase velocity to a visco-acoustic dispersion-relation.

9. The method of claim 1, further comprising using the subsurface image to manage hydrocarbon production.

* * * * *